(12) United States Patent
Izaki

(10) Patent No.: US 9,367,220 B2
(45) Date of Patent: Jun. 14, 2016

(54) IMAGING APPARATUS AND METHOD FOR CONTROLLING THE SAME

(71) Applicant: CANON KABUSHIKI KAISHA, Tokyo (JP)

(72) Inventor: Yuko Izaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 13/734,816

(22) Filed: Jan. 4, 2013

(65) Prior Publication Data

US 2013/0179831 A1 Jul. 11, 2013

(30) Foreign Application Priority Data

Jan. 10, 2012 (JP) ................................. 2012-002404

(51) Int. Cl.

| | | |
|---|---|---|
| *G06F 3/0484* | (2013.01) | |
| *G06F 3/0488* | (2013.01) | |
| *H04N 5/232* | (2006.01) | |
| *H04N 5/235* | (2006.01) | |
| *G03B 17/20* | (2006.01) | |

(52) U.S. Cl.
CPC .......... *G06F 3/04845* (2013.01); *G06F 3/0488* (2013.01); *G06F 3/04847* (2013.01); *H04N 5/2356* (2013.01); *H04N 5/23293* (2013.01); *G03B 17/20* (2013.01)

(58) Field of Classification Search
CPC .......................... H04N 5/2356; G06F 3/04847
USPC .......................................................... 715/833
See application file for complete search history.

(56) References Cited

U.S. PATENT DOCUMENTS

| | | | |
|---|---|---|---|
| 6,177,958 B1 * | 1/2001 | Anderson | 348/362 |
| 6,919,927 B1 | 7/2005 | Hyodo | |
| 7,180,524 B1 * | 2/2007 | Axelrod | 345/593 |

(Continued)

FOREIGN PATENT DOCUMENTS

| | | |
|---|---|---|
| CN | 1755595 A | 4/2006 |
| CN | 101644873 A | 2/2010 |

(Continued)

OTHER PUBLICATIONS

Canon 7D Tips—Auto Exposure Bracketing 6 images or more posted on photoframd.com as of Nov. 17, 2010 available at http://photoframd.com/2010/11/17/canon-7d-tips-auto-exposure-bracketing-6-images-or-more/.*

*Primary Examiner* — William Bashore
*Assistant Examiner* — Nathan Shrewsbury
(74) *Attorney, Agent, or Firm* — Canon U.S.A., Inc. IP Division

(57) ABSTRACT

An imaging apparatus includes a touch detection unit configured to detect a touch operation on a display unit, a display control unit configured to control display of an indicator indicating a reference value in an autobracketing shooting and an indicator indicating a bracketing value in the auto-bracketing shooting, a control unit configured to perform control to increase a width between the reference value and the bracketing value to be set when the touch detection unit detects a touch operation moving in a first direction while keeping touching a setting area for setting the bracketing value on the display unit and to decrease the width when the touch detection unit detects a touch operation moving in a second direction opposite the first direction while keeping touching the setting area, and a bracketing value setting unit configured to set the bracketing value based on the width.

13 Claims, 11 Drawing Sheets

(56) References Cited

U.S. PATENT DOCUMENTS

| | | |
|---|---|---|
| 7,561,201 B2 | 7/2009 | Hong |
| 8,024,669 B2 * | 9/2011 | Hitosuga ................. 715/835 |
| 8,203,641 B2 | 6/2012 | Mori |
| 2008/0036895 A1 * | 2/2008 | Kosaka ................. 348/333.01 |
| 2009/0273575 A1 * | 11/2009 | Pryor ................... 345/173 |
| 2010/0033615 A1 * | 2/2010 | Mori ................... 348/333.12 |
| 2010/0245277 A1 * | 9/2010 | Nakao ................... 345/173 |
| 2011/0283188 A1 * | 11/2011 | Farrenkopf et al. ......... 715/702 |
| 2012/0033959 A1 * | 2/2012 | King ................. 396/157 |
| 2012/0086846 A1 * | 4/2012 | Fuh et al. ............ 348/333.01 |
| 2013/0308032 A1 * | 11/2013 | Terashima ............ 348/333.11 |

FOREIGN PATENT DOCUMENTS

| | | |
|---|---|---|
| CN | 101895683 A | 11/2010 |
| JP | 2010-045425 A | 2/2010 |
| JP | 2010-263264 A | 11/2010 |

* cited by examiner

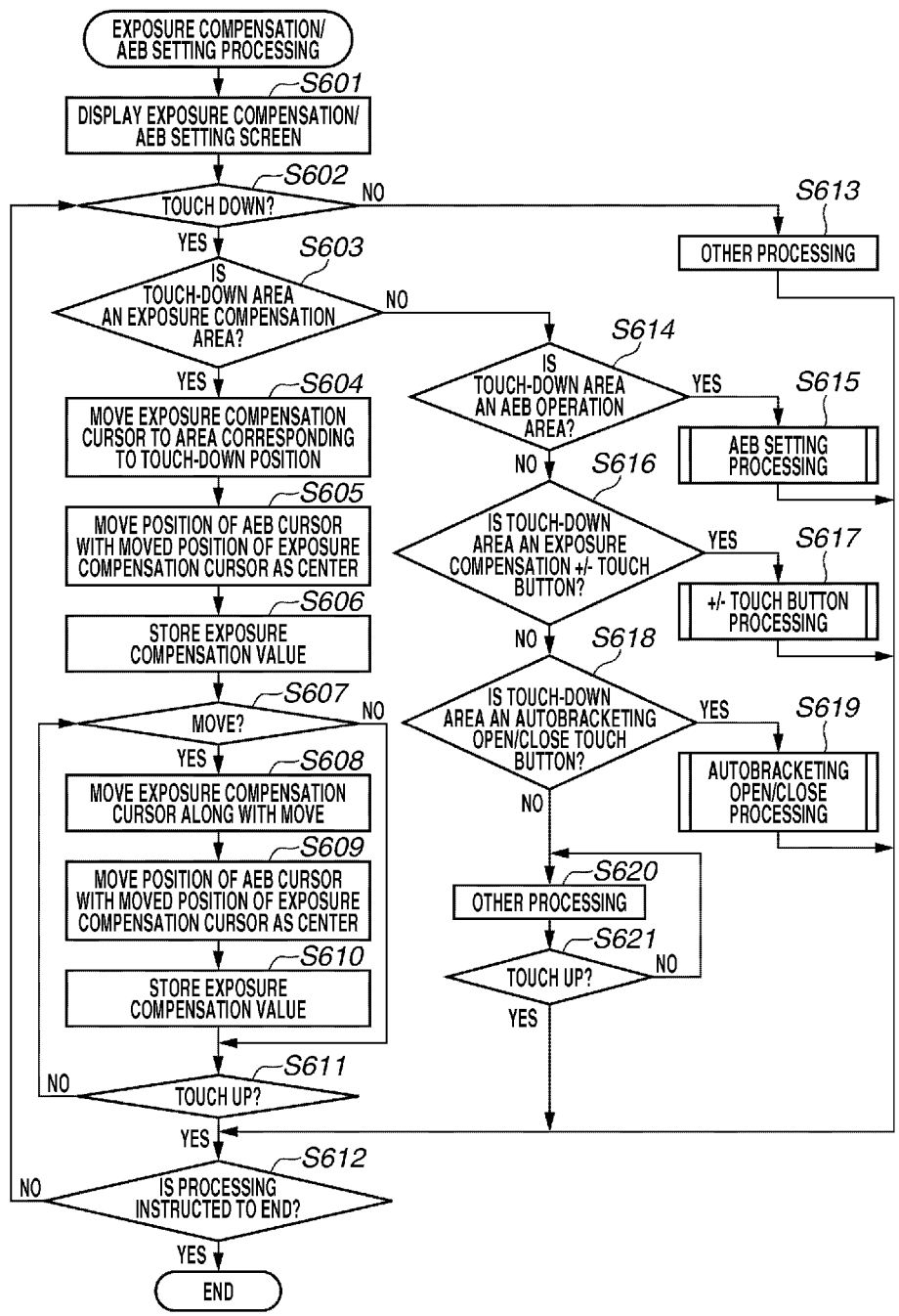

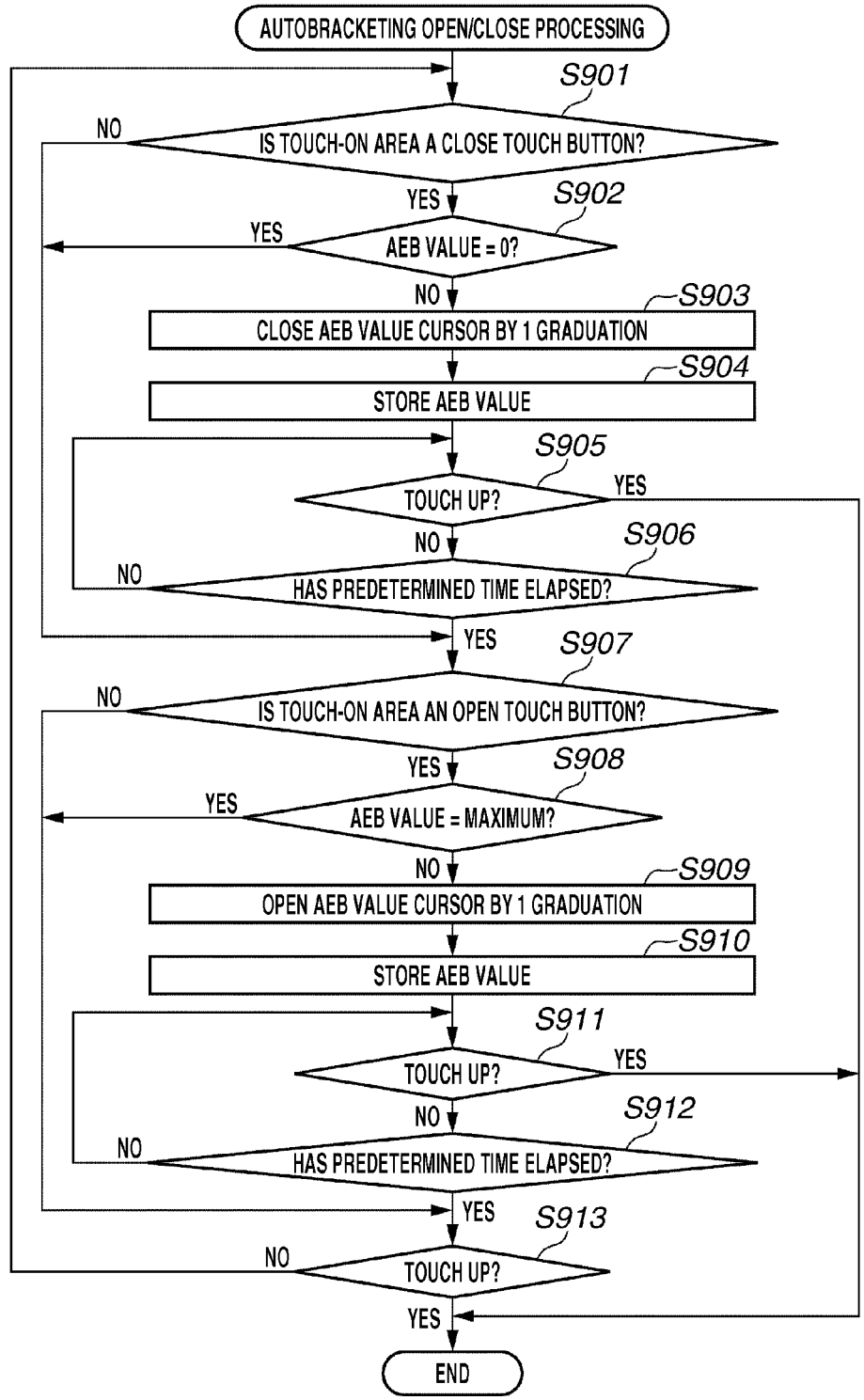

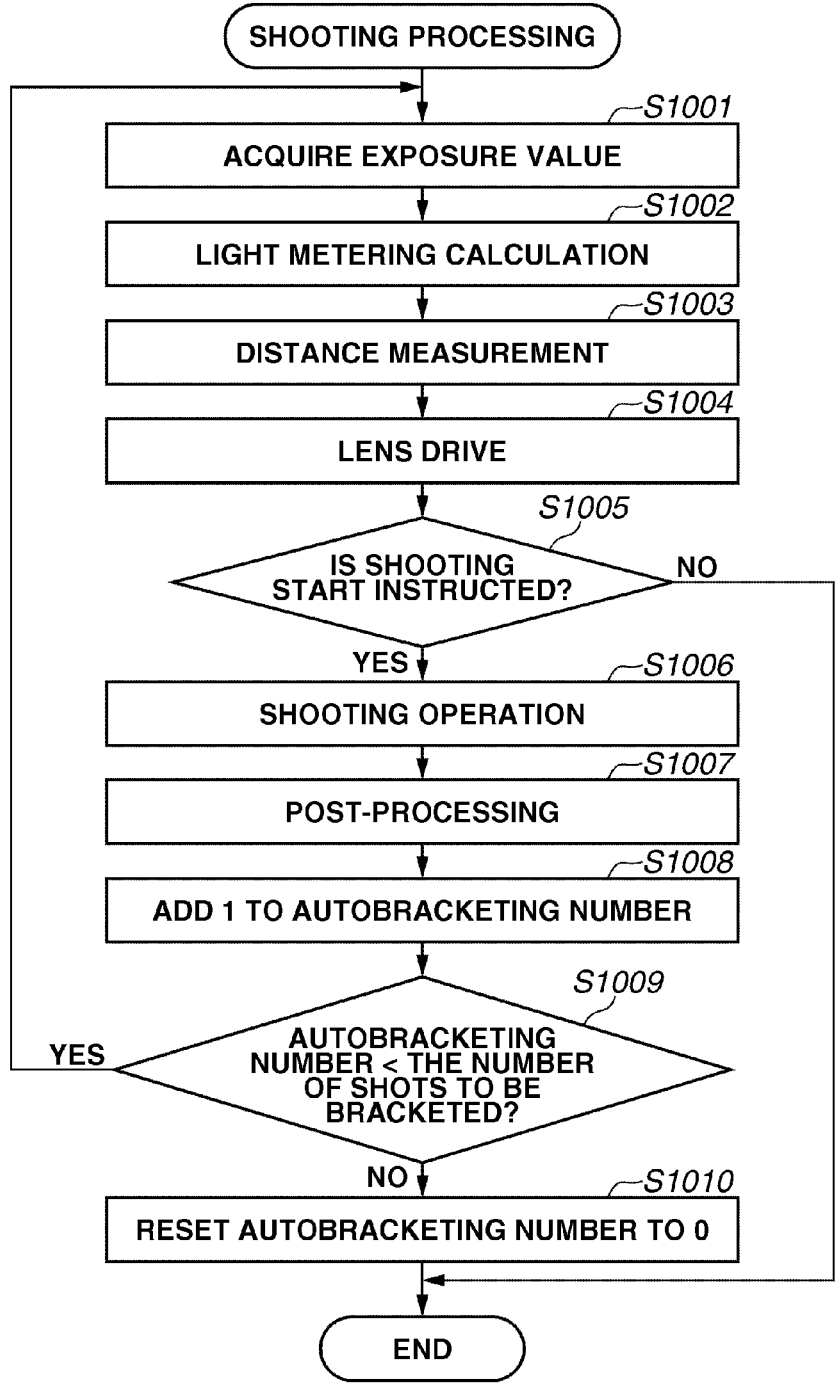

IMAGING APPARATUS AND METHOD FOR CONTROLLING THE SAME

BACKGROUND OF THE INVENTION

1. Field of the Invention

The present invention relates to an imaging apparatus and a method for controlling the same. The present invention relates in particular to an imaging apparatus which sets a parameter of autobracketing using a touch panel, and a method for controlling the same.

2. Description of the Related Art

Until now, there has been an imaging apparatus such as a digital camera which is equipped with an autobracketing function to acquire a plurality of captured images with slightly different settings in which a specific setting value is automatically shifted from a reference value. There has also been an imaging apparatus having an exposure compensation function in which a user compensates a correct exposure value automatically set by the imaging apparatus. Furthermore, an imaging apparatus combining the exposure compensation and autobracketing functions has been proposed. Japanese Patent Application Laid-Open No. 2010-45425 discuses a method for setting the exposure compensation and autobracketing values while the range of settable exposure values is being confirmed in a case where the exposure compensation and autobracketing functions are combined.

In recent years, a touch panel has been widely used as an operation member of an imaging apparatus such as a digital camera. Japanese Patent Application Laid-Open No. 2010-263264 discusses a method for performing various shooting settings such as an International Organization for Standardization (ISO) sensitivity, a flash emission method, a white balance, an exposure compensation value, an exposure time, and an aperture value by the operation on a touch panel. Japanese Patent Application Laid-Open No. 2010-263264 discusses the increase and decrease of a setting value in response to touching any of increase and decrease buttons and determination of setting in response to touching both the increase and decrease buttons at the same time. Furthermore, Japanese Patent Application Laid-Open No. 2010-263264 discusses a parameter setting apparatus capable of changing a parameter value roughly set by touching a touch panel by a fine settable setting unit.

In the techniques discussed in the patent documents, however, a method for setting an autobracketing value with good operability using a touch panel has not been sufficiently considered.

SUMMARY OF THE INVENTION

The present invention is directed to an imaging apparatus which is capable of setting an autobracketing value with good operability using a touch panel.

According to an aspect of the present invention, an imaging apparatus includes a touch detection unit configured to detect a touch operation on a display unit, a display control unit configured to control display of an indicator indicating a reference value in an autobracketing shooting and an indicator indicating a bracketing value in the autobracketing shooting, a control unit configured to perform control to increase a width between the reference value and the bracketing value to be set when the touch detection unit detects a touch operation moving in a first direction while keeping touching a setting area for setting the bracketing value on the display unit and to decrease the width when the touch detection unit detects a touch operation moving in a second direction opposite the first direction while keeping touching the setting area, and a bracketing value setting unit configured to set the bracketing value based on the width.

According to an exemplary embodiment of the present invention, the autobracketing value can be set with good operability using the touch panel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is an example of an exposure compensation/automatic exposure bracketing (AEB) setting screen in a case where an input to a touch panel is turned on.

FIGS. 5A, 5B, 5C, 5D, 5E, 5F, and 5G illustrate display variations of the exposure compensation/AEB setting screen in a case where an input to a touch panel is turned on.

FIG. 6 is a flow chart illustrating the processing in a case where touch operation is performed in an AEB touch area.

FIG. 9 is a flow chart illustrating the processing in a case where the touch operation is performed on an AEB close touch button or an AEB open touch button.

FIG. 10 is a flow chart illustrating processing in autobracketing shooting.

DESCRIPTION OF THE EMBODIMENTS

Various exemplary embodiments, features, and aspects of the invention will be described in detail below with reference to the drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1:
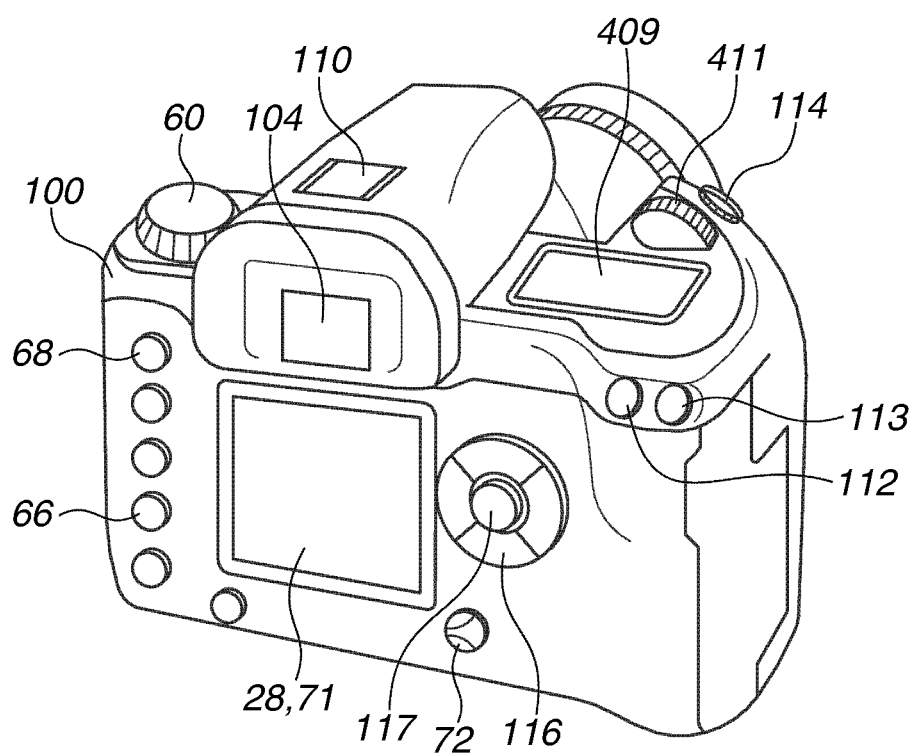
FIG. 1 illustrates a appearance of an imaging apparatus (a digital single-lens reflex camera) according to an exemplary embodiment of the present invention.
Figure 2:
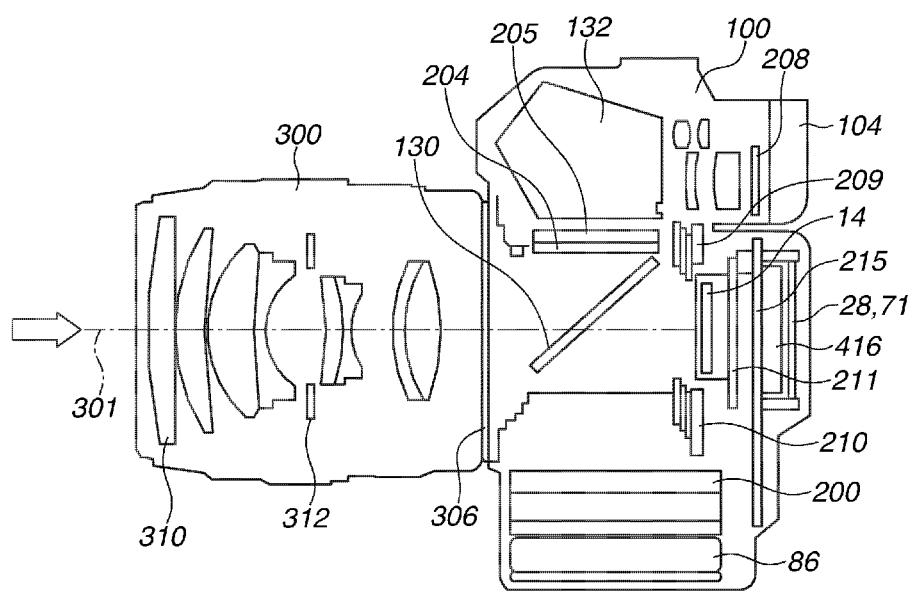
FIG. 2 is a schematic diagram illustrating an internal configuration of the imaging apparatus according to an exemplary embodiment of the present invention.

FIG. 1 illustrates the appearance of an imaging apparatus according to an exemplary embodiment of the present invention. FIG. 2 is a schematic diagram illustrating an internal configuration of the imaging apparatus illustrated in FIG. 1. The imaging apparatus illustrated in FIGS. 1 and 2 is configured as a digital single-lens reflex camera 100 (hereinafter referred to as a camera body).

On the upper surface of the camera body 100 are provided an accessory shoe 110, an optical viewfinder 104, an automatic exposure (AE) lock button 112, a focus detection area selection button 113, and a release button 114. Furthermore, a main electronic dial 411, a mode dial 60, and an external display unit 409 are provided on the upper surface of the camera body 100.

The AE lock button 112 is used when shooting is performed with an exposure value fixed to a correct exposure value acquired by a spot light metering, for example. The focus detection area selection button 113 is used to select a focus detection area in automatic focusing (AF) control.

The main electronic dial 411 is used to input numerical values related to the operation of the camera body 100 or switch a shooting mode by operating the main electronic dial 411 with other operation buttons. The external display unit 409 is formed of a liquid crystal panel and displays information about shooting conditions, such as a shutter speed, an aperture value, and a shooting mode, and other information.

On the back surface of the camera body 100 are provided a display unit 28, a playback button 66, a menu button 68, a sub-electronic dial 116, a SET button 117, and a power switch 72. Furthermore, operation members such as an arrow key and a multi-controller (which are not illustrated) are provided thereon. A touch panel 71 is provided integrally with the display unit 28 on the back surface of the camera body 100. The touch panel 71 is described below.

The display unit 28 is used to display images (image data) acquired by shooting and various setting screens thereon. The display unit 28 is formed of a transmissive liquid crystal display (LCD) and includes a backlight 416 (refer to FIG. 2). The display unit 28 is also used as a menu screen for specifying various setting which can be set by the camera body 100 and various processes which can be processed by the camera body 100 and for displaying an exposure compensation/automatic exposure bracketing (AEB) setting screen (graphic user interface (GUI) screen, refer to FIG. 4) described below.

The playback button 66 is used when captured images are reproduced and displayed on the display unit 28.

The menu button 68 is used to display a menu screen for performing various settings of the image apparatus on the display unit 28. If the shooting mode is set, for example, the menu button 68 is pressed, the sub-electronic dial 116 is operated to select a desired mode, and the SET button 117 is pressed with the desired mode selected, completing the setting of the shooting mode.

Figure 4:
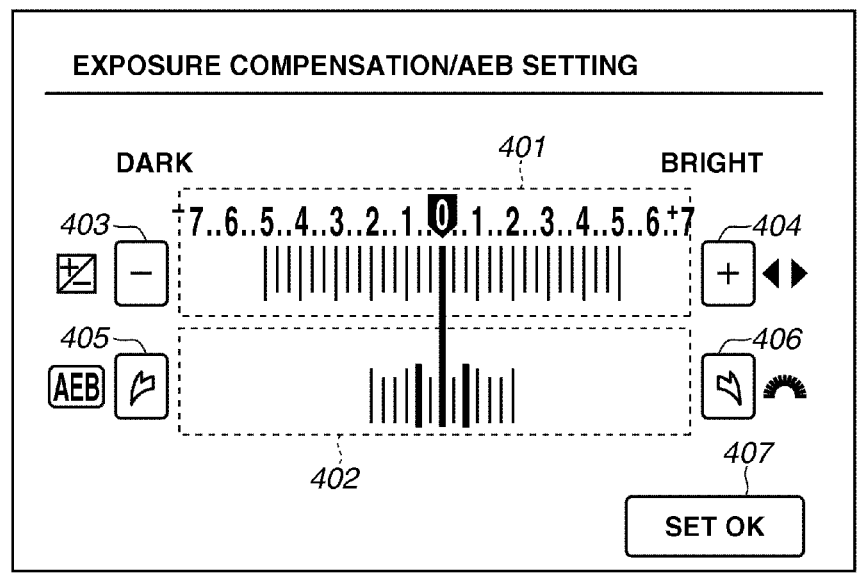

If a shift is performed to the exposure compensation/AEB setting screen in FIG. 4, the menu screen is displayed and then the SET button 117 has only to be pressed with the exposure compensation/AEB setting selected by the sub-electronic dial 116 and the main electronic dial 411.

A mount 106 (refer to FIG. 3) is provided on the front surface of the camera body 100. A mount 306 provided on an interchangeable lens 300 is detachably coupled with the mount 106. In FIG. 2, an optical axis 301 is illustrated. The interchangeable lens 300 is equipped with a lens unit 310 composed of a plurality of lenses and a diaphragm 312.

A mirror 130 is arranged in an imaging optical path inside the camera body 100. The mirror 130 is movable between a position (illustrated in FIG. 2) where the mirror 130 reflects object light from the lens unit 310 towards a finder optical system and a position where the mirror 130 retracts outside the imaging optical path. An object image is formed on a focusing screen 204 by the object light reflected by the mirror 130.

A condenser lens 205 is a lens for improving the visibility of a finder. A pentagonal roof prism 132 guides the object light passing through the focusing screen 204 and the condenser lens 205 to an eyepiece lens 208. The focusing screen 204, the condenser lens 205, and the eyepiece lens 208 form the optical viewfinder 104. The user can observe the object image formed on the focusing screen 204 through the eyepiece lens 208.

Figure 3:
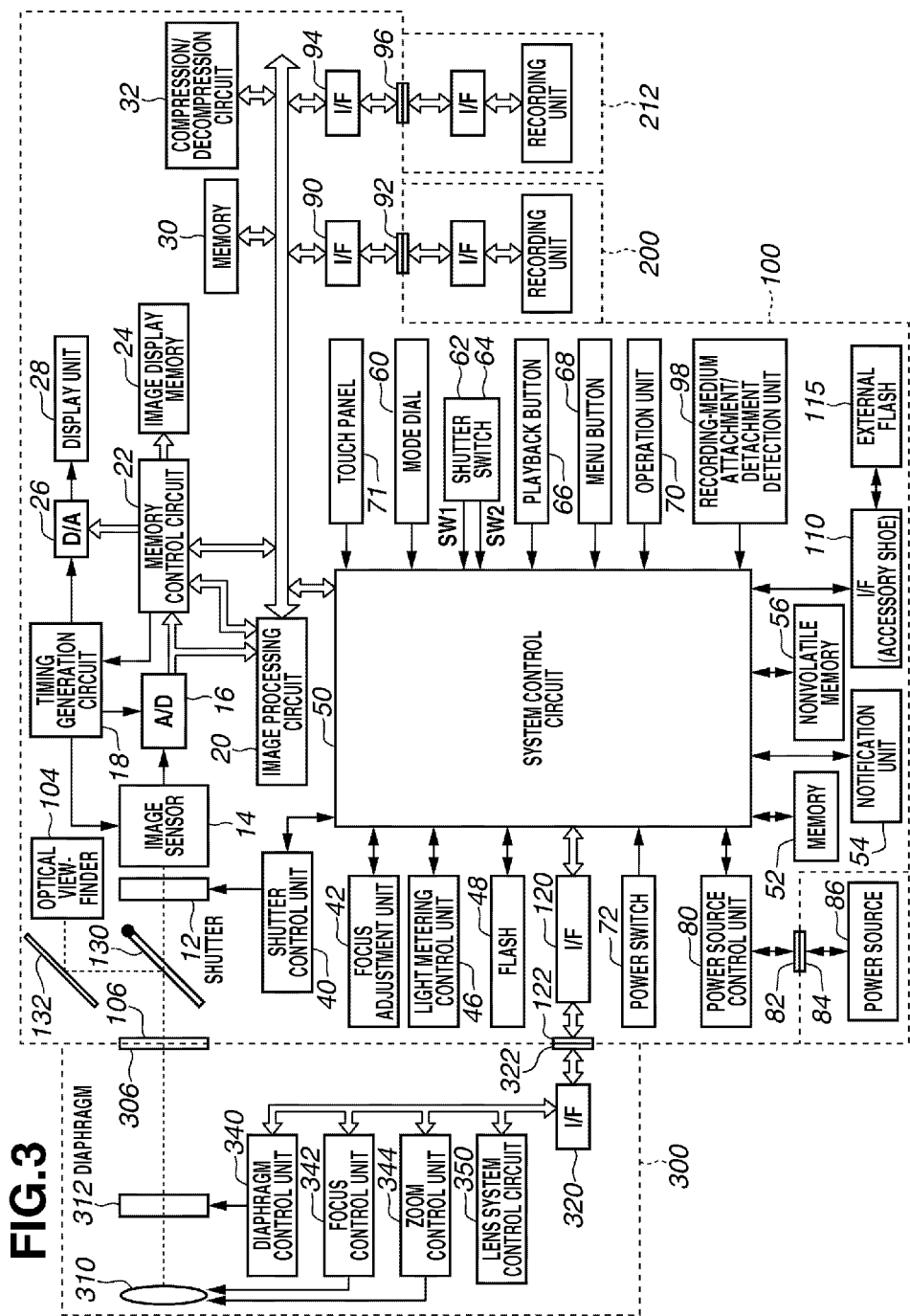
FIG. 3 is a schematic block diagram illustrating a circuit configuration of the imaging apparatus according to an exemplary embodiment of the present invention.

A second curtain 209 and a first curtain 210 constitute a focal plane shutter 12 (refer to FIG. 3). Opening control of the second curtain 209 and the first curtain 210 exposes an image sensor 14 only for a required time period. The image sensor 14 is composed of a charge coupled device (CCD) sensor or a complementary metal oxide semiconductor (CMOS) sensor, and an optical low-pass filter (not illustrated) 418 is arranged on the front surface of the image sensor 14.

The image sensor 14 is connected to a printed circuit board 211. At the back of the printed circuit board 211 is arranged a display substrate 215. On the surface of the opposite side of the display substrate 215 are arranged the display unit 28, the touch panel 71, and the backlight 416.

A recording medium 200 records image data acquired by imaging operation. The recording medium 200 is composed of a semiconductor memory or a hard disk. A power source (secondary battery) 86 supplies power to the camera body 100 and the interchangeable lens 300. The recording medium 200 and the power source 86 are detachable from the camera body 100.

The circuit configuration of the camera body 100 and the interchangeable lens 300 is described below with reference to FIG. 3. In FIG. 3, the components illustrated in FIGS. 1 and 2 are given the same reference numerals as those in FIGS. 1 and 2.

The circuit configuration of the interchangeable lens 300 is described below. The interchangeable lens 300 is provided with a connector 322 and an interface 320 for electrically connecting the interchangeable lens 300 to the camera body 100. The connector 322 and the interface 320 enable a lens system control circuit 350 described below to communicate with a system control circuit 50 functioning as a control unit in the camera body 100 via a connector 122 and an interface 120 provided in the camera body 100.

A diaphragm control unit 340 controls the diaphragm 312. The diaphragm control unit 340 controls the diaphragm 312 in collaboration with a shutter control unit 40 based on light metering information from a light metering control unit 46 described below. A focus control unit 342 controls the focusing operation of a lens unit 310. A zoom control unit 344 controls the zooming operation of the lens unit 310. The lens system control circuit 350 generally controls the various operations of the interchangeable lens 300. The lens system control circuit 350 includes a memory for storing constants, variables, and computer programs for various operations.

The circuit configuration of the camera body 100 is described below. The object light passing through the lens unit 310 and the diaphragm 312 passes through the opened focal plane shutter 12 and is incident on the image sensor 14 with the mirror 130 retracting outside the imaging optical path (or with the mirror 130 arranged inside the imaging optical path, if the mirror 130 is a half mirror). The image sensor 14 photoelectrically converts the incident object light and outputs analog image data.

An analog/digital (A/D) convertor 16 converts an analog signal (image data) output from the image sensor 14 into a digital signal. A timing generation circuit 18 supplies clock signals and control signals to the image sensor 14, the A/D convertor 16, and a digital/analog (D/A) convertor 26 under the control of a memory control circuit 22 and the system control circuit 50.

An image processing circuit 20 subjects image data from the A/D convertor 16 or the memory control circuit 22 to pixel interpolation processing and color conversion processing. The image processing circuit 20 performs a predetermined calculation processing using the image data output from the A/D convertor 16. The system control circuit 50 performs through-the-lens (TTL) autofocus (AF) processing, automatic exposure (AE) processing, and electronic flash preliminary emission (EF) processing for controlling the shutter control unit 40 and a focus adjustment unit 42 based on the calculation results.

The image processing circuit 20 also performs the predetermined calculation processing using the image data output from the A/D convertor 16 to perform a TTL automatic white balance (AWB) based on the calculation results.

The memory control circuit 22 controls the A/D convertor 16, the timing generation circuit 18, the image processing circuit 20, an image display memory 24, the D/A convertor 26, a memory 30, and a compression/decompression circuit 32. The image data output from the A/D convertor 16 are written in the image display memory 24 or the memory 30 via the image processing circuit 20 and the memory control circuit 22 or via only the memory control circuit 22.

The display unit 28 sequentially displays the image data converted to an analog signal by the D/A convertor 26 and written in the image display memory 24. Thereby, the display unit 28 realizes an electronic viewfinder (EVF) function. The display unit 28 turns on or off the electronic viewfinder (EVF) function in accordance with instructions of the system control circuit 50.

The memory 30 stores captured still images. The memory 30 is used as a frame buffer for images continuously written in the recording medium 200 and an attachment apparatus 212 at a predetermined rate in shooting moving images. The memory 30 is also used as a work area for the system control circuit 50.

The compression/decompression circuit 32 compresses and decompresses image data using a known image compression method. The compression/decompression circuit 32 reads the image data stored in the memory 30, subjects the image data to compression processing or decompression processing, and writes the image data subjected thereto again into the memory 30.

The shutter control unit 40 controls the shutter speed of the focal plane shutter 12 in collaboration with the diaphragm control unit 340 based on light metering information from the light metering control unit 46.

The focus adjustment unit 42 detects a difference between the phases of object images passing through the mirror 130 and guided by a sub-mirror (not illustrated) to perform auto focus (AF) processing. The light metering control unit 46 performs automatic exposure (AE) processing based on the output signal from a light measuring sensor (not illustrated).

A flash 48 has a function to project AF auxiliary light and a function to control a flash light amount. The light metering control unit 46 performs flash pre-emission (EF) processing in collaboration with the flash 48.

The system control circuit 50 includes a central processing unit (CPU) and a memory and generally controls the operation of the camera body 100. The memory 52 stores constants, variables, and computer programs (basic programs) for operating the system control circuit 50.

A notification unit 54 displays characters and images by a liquid crystal display (LCD) or a light emitting diode (LED) or outputs voice from a loudspeaker (not illustrated) in response to the execution of computer programs in the system control circuit 50. Thus, the notification unit 54 notifies the outside of the operation status of the camera body 100 and the interchangeable lens 300 and messages. The notification unit 54 includes an LCD unit for displaying an aperture value, a shutter speed, an in-focus degree, a camera-shake warning, and an exposure compensation value in the optical viewfinder 104.

A nonvolatile memory 56 is formed of an electrically erasable programmable read only memory (EEPROM), for example, and used as a memory for storing computer programs. Needless to say, computer programs are computer-readably stored in the nonvolatile memory 56. The computer program includes an application program which can be executed by a computer according to each flowchart described below. The nonvolatile memory 56 also stores setting values set on a GUI screen such as the menu screen and the exposure compensation/AEB setting screen, setting values set by the operation of the main electronic dial 411 and the sub-electronic dial 116, and shooting mode information specified by the operation of the mode dial 60.

A shutter switch (SW1) 62 is turned on by a first stroke operation (half press) of the release button 114 and instructs the system control circuit 50 to start the operation of the AF processing, the AE processing, the AWB processing, and the EF processing. A shutter switch (SW2) 64 is turned on by a second stroke operation (full press) of the release button 114 and instructs the system control circuit 50 to start the operation of a series of the imaging processing formed of the exposure processing, the development processing, and the record processing.

A playback button 66 is operable to instruct the system control circuit 50 to start the operation of playback operation in which image data related to shooting are read from the memory 30, the recording medium 200, or other attachment apparatuses 212 and displayed on the display unit 28.

The menu button 68 is operable to instruct the system control circuit 50 to display the menu screen. The system control circuit 50 is instructed to display the menu screen, reads a shooting condition and others from the nonvolatile memory 56 to generate a menu screen and displays the menu screen on the display unit 28.

The operation unit 70 includes various types of buttons such as the playback button 66 and the menu button 68 and various types of dials such as the main electronic dial 411, the sub-electronic dial 116, and the mode dial 60. The system control circuit 50 performs various operations according to signals from the operation unit 70.

The power switch 72 turns on or off the power source of the camera body 100. The operation of the power switch 72 allows turning on or off at the same time the power source of the interchangeable lens 300, an external flash 115, the recording medium 200, and other attachment apparatuses (a personal computer and others) 212 connected to the camera body 100.

A power source control unit 80 includes a battery detection circuit, a direct current-direct current (DC-DC) converter, and a switch circuit for switching an energizing block. The power source control unit 80 detects whether a battery is attached, detects the type of the battery and a remaining battery capacity, controls the DC-DC converter based on the detection results and the instructions of the system control circuit 50, supplies a required voltage to each unit including the recording medium 200 for a required time period.

Connectors 82 and 84 supply power from the power source 86 such as a battery to the camera body 100, the interchangeable lens 300, the external flash 115, the recording medium 200, and other attachment apparatuses 212. The recording medium 200 and other attachment apparatuses 212 include interfaces 90 and 94, respectively. Connectors 92 and 96 connect the camera body 100 to the recording medium 200 and the other attachment apparatuses 212, respectively. An attachment/detachment detection unit 98 detects whether the recording medium 200 or the other attachment apparatuses 212 is attached to the connectors 92 or 96.

A touch panel 71 which can detect touch on the display unit 28 is provided as one of the operation unit 70. The touch panel 71 and the display unit 28 can be integrated. For example, the touch panel 71 is configured so that light transmissivity does not inhibit the display of the display unit 28, and is attached to the upper layer of the display surface of the display unit 28. Input coordinates on the touch panel 71 are associated with display coordinates on the display unit 28. This allows a GUI to be configured as if the user can directly operate the screen displayed on the display unit 28.

The system control circuit 50 can detect the following operations to which the touch panel 71 is subjected:
(a) Touching the touch panel 71 with a finger or a pen (hereinafter referred to as "touch down");
(b) Keeping the touch panel 71 touched with a finger or a pen (hereinafter referred to as "touch on");
(c) Moving with the touch panel 71 touched with a finger or a pen (hereinafter referred to as "move");
(d) Removing the finger or the pen which touches the touch panel (hereinafter referred to as "touch up"); and
(e) Nothing touching the touch panel 71 (hereinafter referred to as "touch off").
The system control circuit 50 is notified of those operations and position coordinates where a finger or a pen touches the touch panel 71. The system control circuit 50 determines as to what operation is made for the touch panel 71 based on the given information.

The system control circuit 50 can determine a direction in which a finger or a pen moves on the touch panel 71 with respect to the "move" for each of the vertical and horizontal direction components based on a change in position coordinate. When the operations of "touch down" and "touch up" after a certain "move" on the touch panel 71 are performed, this is regarded as drawing a stroke. An operation of quickly drawing the stroke is referred to flick. The flick is an operation in which the finger is quickly moved on the touch panel 71 for some distance with the finger touching the touch panel 71 and removed from the touch panel 71. In other words, the flick is such a quickly sweeping operation that the touch panel 71 is flicked with the finger.

If the system control circuit 50 detects that the "move" is performed over a predetermined distance quickly than a predetermined speed and then detects the "touch up," the system control circuit 50 detects that the flick is performed. If the system control circuit 50 detects that the "move" is performed over the predetermined distance slowly than the predetermined speed, the system control circuit 50 detects that drag is performed.

The touch panel 71 may use any method among various methods, such as a resistance film method, an electrostatic capacity method, a surface acoustic wave method, an infrared method, an electromagnetic induction method, an image recognition method, and an optical sensor method.

In the present exemplary embodiment, the system control circuit 50 can turn on or off an input to the touch panel 71 from the menu screen read from the nonvolatile memory 56 and displayed on the display unit 28.

Even if the input is turned on or off using the touch panel 71, operation can be made using other operation members included in the operation unit 70.

An exemplary embodiment related to the display and operation of the display unit 28 in a case where the input is turned on using the touch panel 71 is described below with reference to FIGS. 4 to 6.

FIG. 4 illustrates an example of a display screen of the display unit 28 in performing input using the touch panel 71. Items which are arranged on the screen and can be operated by user's touch are described below.

The user can change an exposure compensation value by the "touch down" or the "move" operation in an exposure compensation touch area 401.

The autobracketing value can be changed by performing the "move" operation to the left or right directions in an autobracketing touch area (AEB operation area) 402.

The exposure compensation value can be decremented by one graduation by performing the "touch down" operation on an exposure compensation– (minus) touch button 403. Long pressing the exposure compensation–touch button 403 (i.e., continuing the "touch on" operation) allows the exposure compensation value to be continuously decreased according to the time period for which the button 403 is long pressed.

The exposure compensation value can be incremented by one graduation by performing the "touch down" operation on an exposure compensation+ (plus) touch button 404. Long pressing the exposure compensation+touch button 404 allows the exposure compensation value to be continuously increased according to the time period for which the button 404 is long pressed.

An autobracketing width can be closed by one graduation by performing the "touch down" operation on an autobracketing close touch button 405. Long pressing the autobracketing close touch button 405 allows the autobracketing width to be continuously closed according to the time period for which the button 405 is long pressed.

An autobracketing width can be opened by one graduation by performing the "touch down" operation on an autobracketing open touch button 406. Long pressing the autobracketing open touch button 406 allows the autobracketing width to be continuously opened according to the time period for which the button 406 is long pressed.

The "touch up" operation on a SET button 407 allows ending the exposure compensation/AEB setting screen and returning to the menu screen.

Exposure compensation/AEB setting processing which can be performed by displaying the exposure compensation/AEB setting screen illustrated in FIG. 4 is described below with reference to FIGS. 5A to 5G and FIG. 6. FIGS. 5A to 5G illustrate various variations in the exposure compensation/AEB setting screen in a case where the input to the touch panel is turned on. FIG. 6 is a flow chart of the exposure compensation/AEB setting processing which can be performed by displaying the exposure compensation/AEB setting screen in FIG. 4. The processing is realized such that the program stored in the nonvolatile memory 56 is loaded in the memory 52 and executed by the system control circuit 50. As described above, the user selecting the exposure compensation/AEB setting on the menu screen and pressing the SET button 117 causes the system control circuit 50 to start the exposure compensation/AEB setting processing in FIG. 6.

Figure 5A:
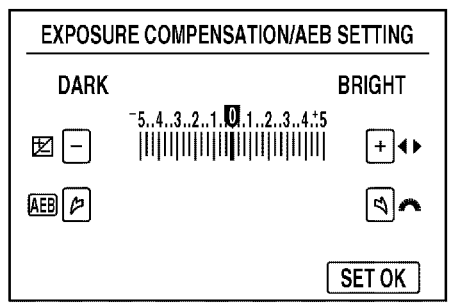

In step S601, the system control circuit 50 causes the display unit 28 to display an initial screen thereon. An exposure compensation value and an autobracketing width corresponding to the present status of the imaging apparatus stored in the nonvolatile memory 56 are displayed on the initial screen. FIG. 5A illustrates an example displayed on the initial screen and the example in a case where an exposure compensation value=0 and an AEB value=0 (autobracketing off), for example, are set.

In step S602, the system control circuit 50 determines whether the "touch down" operation is performed on the touch panel 71. If the "touch down" operation is performed (YES in step S602), the processing proceeds to step S603. If the "touch down" operation is not performed (NO in step S602), the processing proceeds to step S613.

In step S603, the system control circuit 50 determines whether a "touch down" area is an exposure compensation touch area 401. If the "touch down" operation is performed on the exposure compensation touch area 401 (YES in step S603), the processing proceeds to step S604. If the "touch down" area is not the exposure compensation touch area 401 (NO in step S603), the processing proceeds to step S614.

Figure 5B:
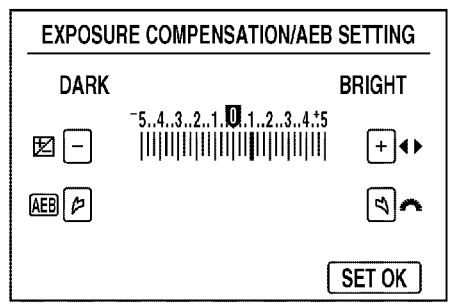

In step S604, the system control circuit 50 moves an exposure compensation cursor to a position corresponding to the "touch down" area in the display unit 28 and causes the display unit 28 to display the cursor. The exposure compensation cursor is an indicator for the user setting the exposure compensation value. For example, if the system control circuit 50 detects the "touch down" on a part corresponding to position "1" on the scale displayed in the exposure compensation touch area 401 in the display state in FIG. 5A, the exposure compensation cursor is moved to the position "1" on the scale as illustrated in FIG. 5B.

In step S605, the system control circuit 50 moves the position of an autobracketing cursor with the position of the exposure compensation cursor moved in step S604 as a center. The autobracketing cursor is an indicator used when the user sets AEB (when the use sets the AEB width). If the AEB width=0 (autobracketing off), this step is omitted.

In step S606, the system control circuit 50 causes the nonvolatile memory 56 to store the exposure compensation value moved in step S604. This sets the exposure compensation value.

In step S607, the system control circuit 50 determines whether the "move" operation is performed. If the "move" operation is performed (YES in step S607), the processing proceeds to step S608. If the "move" operation is not performed (NO in step S607), the processing proceeds to step S611.

In step S608, the system control circuit 50 moves the exposure compensation cursor to a position corresponding to the move area and causes the display unit 28 to display the cursor. More specifically, the system control circuit 50 causes the exposure compensation cursor to move while following the "move" operation (following the position of the touching finger).

In step S609, the system control circuit 50 moves the position of the autobracketing cursor with the position of the exposure compensation cursor caused to move while following the "move" operation as a center. If the AEB width=0 (autobracketing off), this step is omitted.

In step S610, the system control circuit 50 causes the nonvolatile memory 56 to store the exposure compensation value moved in step S608. This sets the exposure compensation value.

In step S611, the system control circuit 50 determines whether the "touch up" operation is performed on the touch panel 71. If the "touch up" operation is not performed thereon (NO in step S611), the processing returns to step S607 to repeat the processing. If the "touch up" operation is performed thereon (YES in step S611), the processing proceeds to step S612.

In step S612, the system control circuit 50 determines whether the exposure compensation/AEB setting screen is instructed to end. Instructions for the end of the exposure compensation/AEB setting screen include an operation for turning off the power source and instructions for shifting a mode to other modes such as the shooting mode as well as the "touch up" operation on the SET button 407. If the system control circuit 50 determines that the exposure compensation/AEB setting screen is not instructed to end (NO in step S612), the processing returns to step S607 to repeat the processing. If the system control circuit 50 determines that the exposure compensation/AEB setting screen is instructed to end (YES in step S612), the system control circuit 50 end the exposure compensation/AEB setting processing.

In step S613, the system control circuit 50 performs other processing. Other processing includes processing according to the operation of operation members other than the touch panel 71 out of the operation unit 70, shooting processing, and processing for shifting a mode to a reproduction mode. The system control circuit 50 ends other processing and proceeds to step S612.

In step S614, the system control circuit 50 determines whether the "touch down" area is the autobracketing touch area 402. If the "touch down" area is not the autobracketing touch area 402 (NO in step S614), the processing proceeds to step S616. If the "touch down" area is the autobracketing touch area 402 (YES in step S614), the processing proceeds to step S615. In step S615, the system control circuit 50 performs the AEB setting processing. The AEB setting processing is described in detail below with reference to FIG. 7.

In step S616, the system control circuit 50 determines whether the "touch down" area is the exposure compensation+touch button 404 or the exposure compensation−touch button 403. If the "touch down" area is the exposure compensation+touch button 404 or the exposure compensation−touch button 403 (YES in step S616), the processing proceeds to step S617. In step S617, the system control circuit 50 performs +/−touch button processing. The +/−touch button processing is described in detail below with reference to FIG. 8. If the "touch down" area is neither the exposure compensation+touch button 404 nor the exposure compensation−touch button 403 (NO in step S616), the processing proceeds to step S618.

In step S618, the system control circuit 50 determines whether the "touch down" area is the autobracketing open touch button 406 or the autobracketing close touch button 405. If the "touch down" area is the autobracketing open touch button 406 or the autobracketing close touch button 405 (YES in step S618), the processing proceeds to step S619. In step S619, the system control circuit 50 performs an autobracketing open/close processing. The autobracketing open/close processing is described in detail below with reference to FIG. 9. If the "touch down" area is neither the autobracketing open touch button 406 nor the autobracketing close touch button 405 (NO in step S618), the processing proceeds to step S620.

In step S620, the system control circuit 50 performs other processing according to the "touch down" area. In step S621, the system control circuit 50 determines whether the "touch up" operation is performed. If the "touch up" operation is not performed (NO in step S620), the processing returns to step S620. If the "touch up" operation is performed (YES in step S620), the processing proceeds to step S612.

Figure 7:
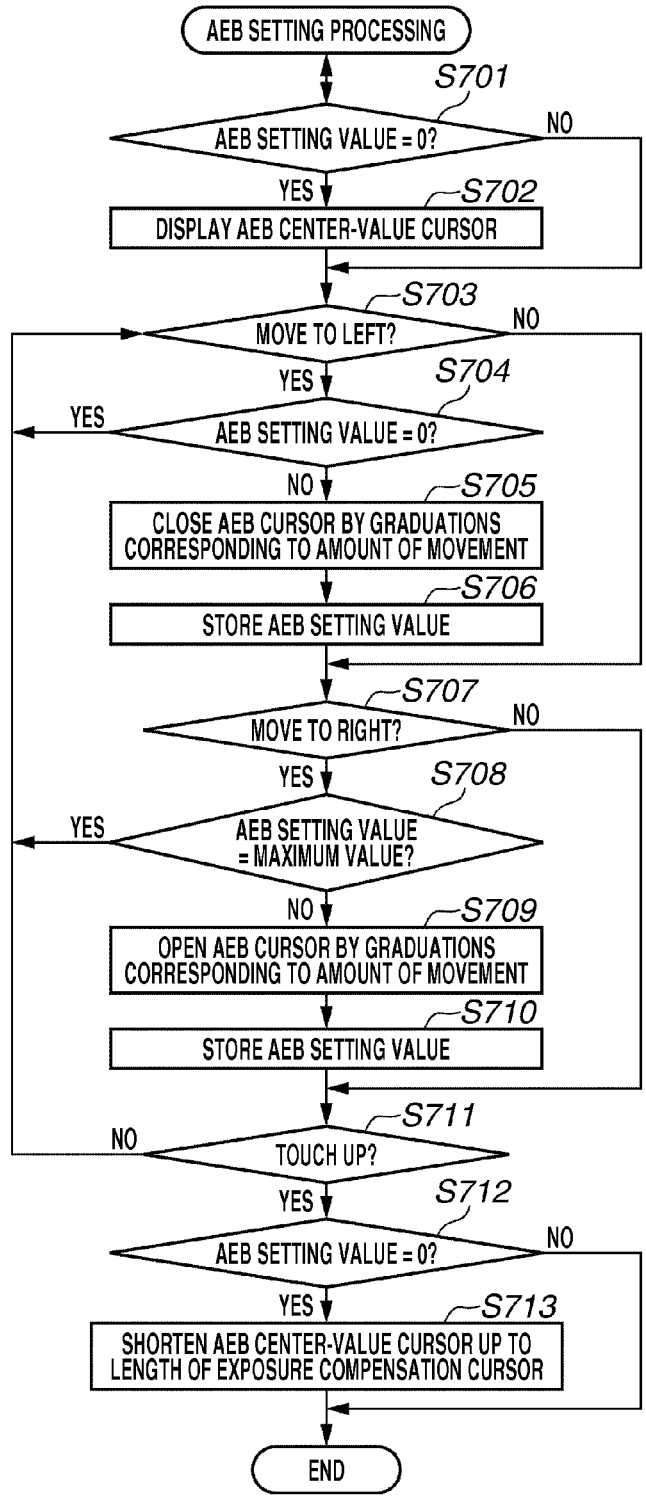
FIG. 7 is a flow chart illustrating the processing in a case where the touch operation is performed in an exposure-compensation touch area.

The AEB setting processing in step S615 in FIG. 6 is described below with reference to FIG. 7. The processing is realized such that the program stored in the nonvolatile memory 56 is loaded in the memory 52 and executed by the system control circuit 50.

In step S701, the system control circuit 50 determines whether the present autobracketing setting value is zero, i.e., the AEB width=0 (autobracketing off). If the present autobracketing setting value is zero (YES in step S701), the processing proceeds to step S702. If the present autobracketing setting value is not zero (NO in step S701), the processing proceeds to step S703.

Figure 5C:
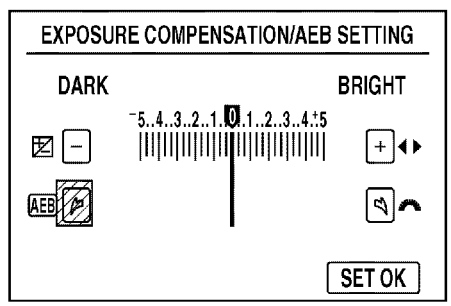
Figure 5D:
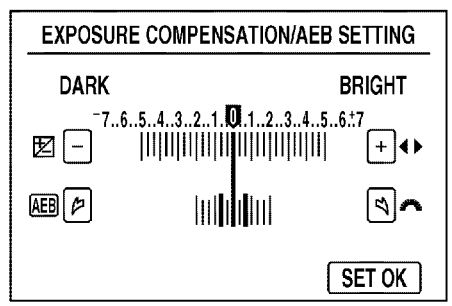

In step S702, as illustrated in FIG. 5C, the system control circuit 50 extends the cursor of the exposure compensation value being the center value of the autobracketing to the autobracketing touch area 402 and displays the cursor on the display unit 28. This allows the user to easily identify the center value of the autobracketing to be set.

In step S703, the system control circuit 50 determines where in the autobracketing touch area 402 the "move" operation is performed in the left direction. In other words, the system control circuit 50 determines only whether the "move" operation is performed in the left direction irrespective of where in the autobracketing touch area 402 the "move" operation is performed. If the system control circuit 50 can determine that the "move" operation is performed in the left direction at any position in the autobracketing touch area 402, the system control circuit 50 determines that the "move" operation is performed in the left direction. If the system control circuit 50 determines that the "move" operation is performed in the left direction (YES in step S703), the processing proceeds to step S704. If the system control circuit 50 determines that the "move" operation is not performed in the left direction (NO in step S703), the processing proceeds to step S707.

In step S704, the system control circuit 50 determines whether the present autobracketing setting value is zero, i.e., the AEB width=0 (autobracketing off). If the present autobracketing setting value is zero (YES in step S704), the bracketing width cannot be closed any longer, so that the "move" operation to the left is ineffective. For this reason, the processing returns to step S703. If the present autobracketing setting value is not zero (NO in step S704), the processing proceeds to step S705.

In step S705, the system control circuit 50 detects the amount of movement of the "move" operation to the left and closes the autobracketing cursor according to the detected amount of movement of the "move" operation (to be exact, according to the horizontal-direction (or the scale arrangement direction) component of the amount of movement of the "move" operation. An amount closed by the cursor (the amount of movement on the scale) is made smaller than the horizontal-direction component in the amount of movement by the "move" operation. Thereby, even if the amount of operation with a finger by the "move" operation is large, the autobracketing setting value can be accurately moved (i.e., fine-tuned). An amount closed by the cursor (the amount of movement on the scale) is represented by the following equation (1):

$$\text{The amount of movement of the cursor(gradations)}= [\text{movement amount}(m)/\text{interval between gradations}(m)]\times M \quad (1)$$

where, 0<M<1.

If the number of shots to be bracketed (the number of shots taken by an autobracketing shooting) is five or more, the system control circuit 50 displays a plurality of cursors on the under-exposure and over-exposure sides of the exposure compensation value. If the number of shots to be bracketed is five, the autobracketing cursor lies on two exposure compensation values on the under-exposure side, two on the over-exposure side, and one at the center, for example. The width of the autobracketing setting value (AEB width) has two types of width (outside and inside widths). In this case, the amount closed by the cursor (the amount of movement on the scale) may be determined such that the cursor indicating the inside width is determined using the above equation (1) and the cursor indicating the outside width is determined by an equation in which M in the equation (1) is replaced with N (>M). Thereby, the user can operate both at the same time while viewing how the inner and outer autobracketing setting values are changed according to the "move" operation. In a case where the cursor is increased with the number of shots to be bracketed as seven or more, similarly, the amount of movement of the cursor can be represented by an equation in which the constant M in the equation (1) is replaced with other constants.

The system control circuit 50 closes the autobracketing cursor according to the amount of movement of the "move" operation to the left. As described in step S704, if the autobracketing setting value becomes 0, the system control circuit 50 makes the "move" operation to the left ineffective to turn off the autobracketing. Therefore, if the user wants to turn off the autobracketing in a case where the autobracketing setting value is not 0, the user has only to roughly and largely "move" to the left with respect to the autobracketing touch area 402. Thus, the system control circuit 50 can quickly and surely turn off the autobracketing without requiring a fine operation. Therefore, the user can quickly cope with a good opportunity to take a picture.

In step S706, the system control circuit 50 stores the autobracketing setting value (AEB width) corresponding to the position of the cursor moved in step S705 in the nonvolatile memory 56. This sets the autobracketing setting value.

In step S707, the system control circuit 50 determines where in the autobracketing touch area 402 the "move" operation is performed in the right direction. In other words, the system control circuit 50 determines only whether the "move" operation is performed in the right direction irrespective of where in the autobracketing touch area 402 the "move" operation is performed. If the system control circuit 50 can determine that the "move" operation is performed in the right direction at any position in the autobracketing touch area 402, the system control circuit 50 determines that the "move" operation is performed in the right direction. If the system control circuit 50 determines that the "move" operation is performed in the right direction (YES in step S707), the processing proceeds to step S708. If the system control circuit 50 determines that the "move" operation is not performed in the right direction (NO in step S707), the processing proceeds to step S711.

In step S708, the system control circuit 50 determines whether the present autobracketing setting value is a settable maximum value (maximum width). If the present autobracketing setting value is the maximum value (YES in step S708), the bracketing width cannot be opened any longer, so that the "move" operation to the right is ineffective. For this reason, the processing returns to step S703. If the present autobracketing setting value is not the maximum value (NO in step S708), the processing proceeds to step S709.

In step S709, the system control circuit 50 detects the amount of movement of the "move" operation to the right. The system control circuit 50 opens the autobracketing cursor according to the amount of movement of the "move" operation to the right (to be exact, according to the horizontal-direction component of the amount of movement of the "move" operation). An amount opened by the cursor (the amount of movement on the scale) is equal to the above equation (1). For example, if the autobracketing cursor is opened when the autobracketing setting value is 0, the system control circuit 50 updates the display state of the display unit 28 in FIG. 5C to that in FIG. 5D.

In step S710, the system control circuit 50 stores the autobracketing setting value (AEB width) corresponding to the position of the cursor moved in step S709 in the nonvolatile memory 56. This sets the autobracketing setting value.

In step S711, the system control circuit 50 determines whether the "touch up" operation is performed. If the "touch up" operation is not performed (NO in step S711), the processing returns to step S703. If the "touch up" operation is performed (YES in step S711), the processing proceeds to step S712.

In step S712, the system control circuit 50 determines whether the present autobracketing setting value is zero, i.e., the AEB width=0 (autobracketing off). If the present autobracketing setting value is not zero (NO in step S712), the AEB setting processing is ended and the processing proceeds to step S616 in FIG. 6. If the present autobracketing setting value is zero (YES in step S712), the autobracketing is off, so that the cursor at the center value of the autobracketing which is connected to the cursor of the exposure compensation value in the exposure compensation touch area 401, extends to the autobracketing touch area 402, and is displayed is elongated to the length of the exposure compensation cursor. The system control circuit 50 changes the display state in FIG. 5C into that in FIG. 5A, for example. The system control circuit 50 completes the AEB setting processing and causes the processing to proceed to step S616.

Thus, in the present exemplary embodiment, the autobracketing setting value can be set by the touch operation ("move") at one point in the autobracketing touch area 402. The user, therefore, can perform operation for setting the autobracketing setting value even with his finger holding the camera body 100. For this reason, the user can set the autobracketing setting value even with the camera body 100 held with his both hands when shooting. For example, although it is difficult to perform a two-point touch operation using two fingers with the hand holding the camera body 100, the present exemplary embodiment capable of adjusting a shooting setting value is advantageous to the above difficulty.

In the AEB setting processing, the system control circuit 50 determines whether the "move" operation is performed in the right direction or in the left direction irrespective of where in the autobracketing touch area 402 the "move" operation is performed. For this reason, the autobracketing setting value is set according to only the direction and movement amount of the "move" operation irrespective of the "touch-down position and the "touch-up position in the autobracketing touch area 402. Such a configuration allows setting the autobracketing setting value (width) even with the "move" operation at any position in the autobracketing touch area 402 irrespective of where the autobracketing center value (=the exposure compensation value) lies.

Therefore, the user can adjust the autobracketing setting value by performing the "move" operation at any position in the autobracketing touch area 402. For example, the user can adjust the autobracketing setting value without changing the position of his hand holding the camera irrespective of the exposure compensation value, provided that the user holds the camera at a position where his finger reaches the autobracketing touch area 402. Even in a case where the user performs the touch operation in the autobracketing touch area 402 with his finger holding the camera body 100, the user can adjust the autobracketing setting value while viewing the display to confirm a relationship between the exposure compensation value and the autobracketing setting value.

As described above, the present exemplary embodiment can perform the autobracketing setting by the "move" operation (sliding a finger to the left and right) to allow providing the user with user-friendliness. In other words, the accurate "touch down" operation at a one center-point of the autobracketing is required of a conventional "touch down" operation when the user wants to turn off the autobracketing. For this reason, the touch area is inevitably decreased to make it difficult for the user to operate. On the other hand, according to the present exemplary embodiment, the autobracketing is opened by the "move to the right" operation and the autobracketing is closed by the "move to the left" operation, so that setting and OFF operation can be easily performed with a single touch. More specifically, the user can open the autobracketing by performing the "move" operation on the touch panel in a predetermined direction (in the right direction) and close the autobracketing by performing the "move" operation in the direction opposite to the predetermined direction (in the left direction). For this reason, the user can easily perform the autobracketing setting.

In a conventional "pinch-in/pinch-out" operation, operation needs to be performed by removing one hand holding a camera or with both thumbs. On the other hand, according to the present exemplary embodiment, the user can perform operation with a single finger, so that user-friendliness can be provided even when the user performs the setting with the user quickly ready to take a picture with the camera.

In a case where the number of shots to be bracketed is set to five or more and a conventional "touch down" operation is performed, the user cannot intuitively understand whether the autobracketing is set by a single width or a maximum width of the autobracketing. On the other hand, according to the present exemplary embodiment, "single width" and "maximum width" of the autobracketing can be moved and operated by the "move" operation at the same time. For this reason, the user can read how the setting desired to be set is, while performing the operation.

Figure 8:
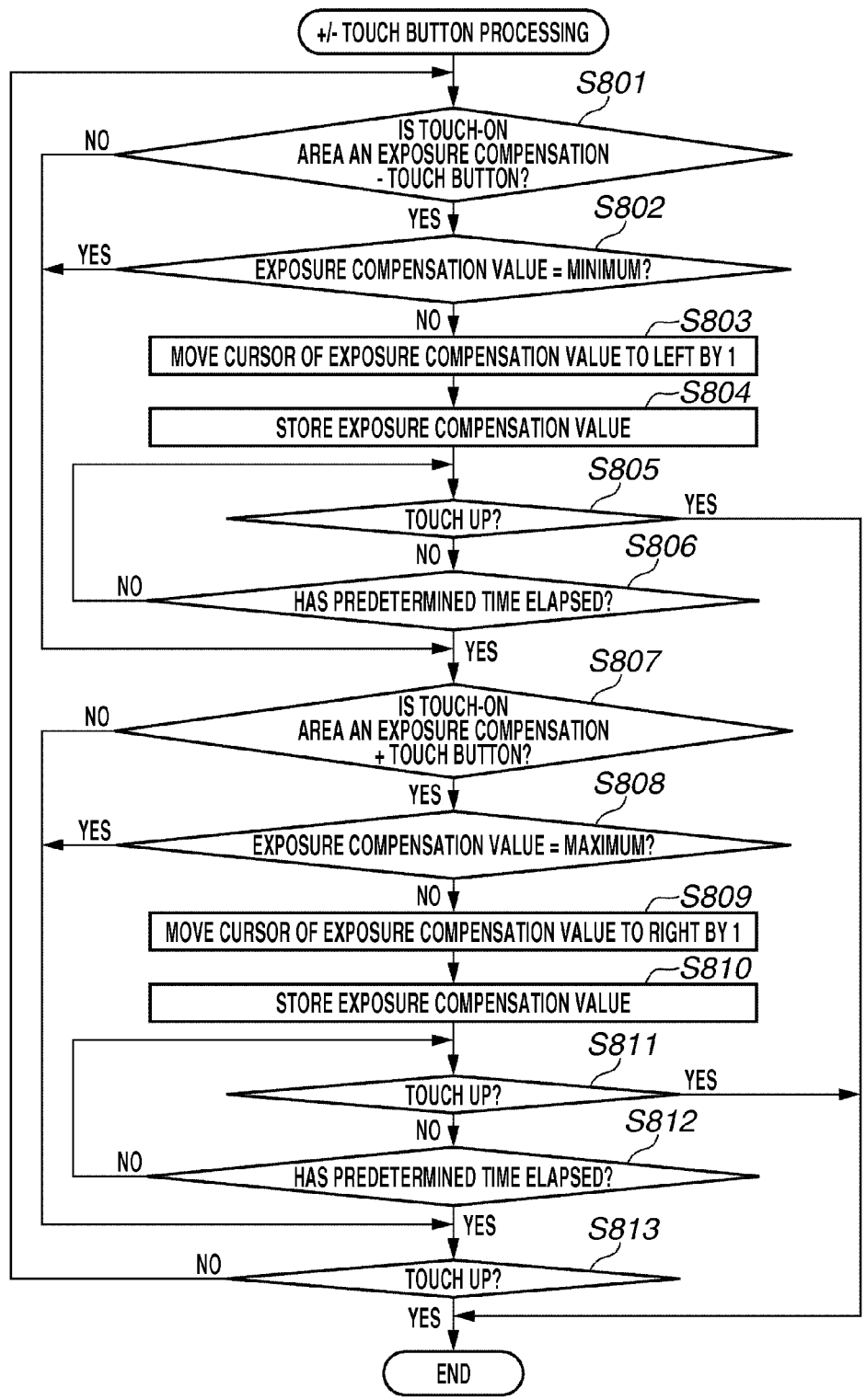
FIG. 8 is a flow chart illustrating the processing in a case where the touch operation is performed on an exposure compensation−touch button or an exposure compensation+touch button.

The +/−touch button processing is described below with reference to FIG. 8. FIG. 8 is a detailed flow chart of the +/−touch button processing described in step S617 in FIG. 6. The processing is realized such that the program stored in the nonvolatile memory 56 is loaded in the memory 52 and executed by the system control circuit 50.

In step S801, the system control circuit 50 determines whether a touched area (a "touch on" area) lies on the exposure compensation−touch button 403. If the touched area lies on the exposure compensation−touch button 403 (YES in step S801), the processing proceeds to step S802. Otherwise (NO in step S801), the processing proceeds to step S807.

Figure 5E:
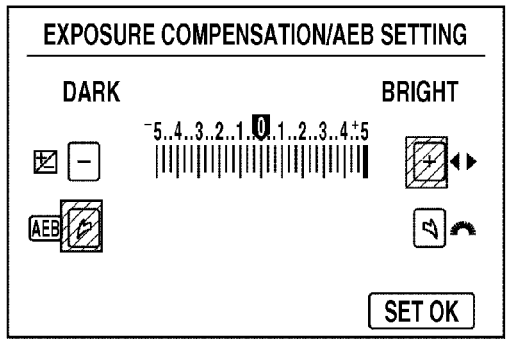
Figure 5F:
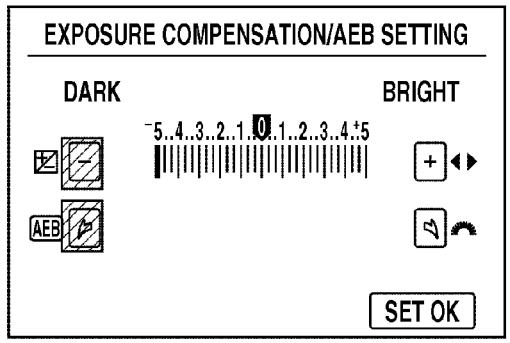

In step S802, the system control circuit 50 determines whether the presently set exposure compensation value is a settable minimum value. If the exposure compensation value is the settable minimum value (YES in step S802), the cursor indicating the exposure compensation value is displayed on the left end on the scale as illustrated in FIG. 5F. If the exposure compensation value is the settable minimum value, the exposure compensation−touch button 403 is grayed out (identification display) to indicate that the button 403 is ineffective. If the exposure compensation value is the settable minimum value, it is ineffective to perform the touch operation on the exposure compensation−touch button 403, so that the processing proceeds to step S807. If the exposure compensation value is not the settable minimum value, the processing proceeds to step S803.

In step S803, the system control circuit 50 moves the cursor of the exposure compensation value to the left by one gradation.

In step S804, the system control circuit 50 stores the value of the gradation in the position where the cursor is moved in step S803 as an exposure compensation value in the nonvolatile memory 56. This sets the exposure compensation value.

In step S805, the system control circuit 50 determines whether the "touch up" operation is performed on the touch panel 71. If the "touch up" operation is performed (YES in step S805), +/−touch button processing is ended. The processing proceeds to step S618 in FIG. 6. If the "touch up" operation is not performed (NO in step S805), the processing proceeds to step S806.

In step S806, the system control circuit 50 determines whether a predetermined time has elapsed since the cursor was moved in step S803. The predetermined time is used to measure a time period required until the processing corresponding to the touch position is performed again in a case where the "touch on" (kept touched) operation is continued and is 1 to 2 seconds. If the predetermined time has not elapsed (NO in step S806), the processing returns to step S805. If the predetermined time has elapsed (YES in step S806), the processing proceeds to step S807. Thereby, if the touch position is not moved from the exposure compensation–touch button 403 even after the predetermined time has elapsed, the system control circuit 50 makes a determination of "NO" in both steps S807 and S813 described below and makes again determination of "YES" in step S801. For this reason, the cursor of the exposure compensation value is further moved to the left in step S803. In other words, long pressing the exposure compensation–touch button 403 allows the cursor to be continuously moved to the left. Other algorithm may be used provided that the cursor can be moved to the left by long pressing the exposure compensation–touch button 403.

In step S807, the system control circuit 50 determines whether a touched area (a "touch on" area) lies on the exposure compensation+touch button 404. If the touched area lies on the exposure compensation+touch button 404 (YES in step S807), the processing proceeds to step S808. Otherwise (NO in step S807), the processing proceeds to step S813.

In step S808, the system control circuit 50 determines whether the presently set exposure compensation value is a settable maximum value. If the exposure compensation value is the settable maximum value (YES in step S808), the cursor indicating the exposure compensation value is displayed on the right end on the scale as illustrated in FIG. 5E. If the exposure compensation value is the settable maximum value, the exposure compensation+touch button 404 is grayed out (identification display) to indicate that the button 404 is ineffective. If the exposure compensation value is the settable maximum value, it is ineffective to perform the touch operation on the exposure compensation+touch button 404, so that the processing proceeds to step S813. If the exposure compensation value is not the settable maximum value (NO in step S808), the processing proceeds to step S809.

In step S809, the system control circuit 50 moves the cursor of the exposure compensation value to the right by one gradation.

In step S810, the system control circuit 50 stores the value of the gradation in the position where the cursor is moved in step S809 as an exposure compensation value in the nonvolatile memory 56. This sets the exposure compensation value.

In step S811, the system control circuit 50 determines whether the "touch up" operation is performed. If the "touch up" operation is performed (YES in step S811), the +/−touch button processing is ended. The processing proceeds to step S618 in FIG. 6. If the "touch up" operation is not performed (NO in step S811), the processing proceeds to step S812.

In step S812, the system control circuit 50 determines whether a predetermined time has elapsed since the cursor was moved in step S809. If the predetermined time has not elapsed (NO in step S812), the processing returns to step S811. If the predetermined time has elapsed (YES in step S812), the processing proceeds to step S813. The processing is carried out for the reason similar to that described in step S806.

In step S813, the system control circuit 50 determines whether the "touch up" operation is performed. If the "touch up" operation is not performed (NO in step S813), the processing returns to step S801 to repeat the processing. If the "touch up" operation is performed (YES in step S813), the +/−touch button processing is ended. The processing proceeds to step S618 in FIG. 6.

The autobracketing open/close processing in step S619 in FIG. 6 is described below with reference to FIG. 9. FIG. 9 is a detailed flow chart of the autobracketing open/close processing described in step S619 in FIG. 6. The processing is realized such that the program stored in the nonvolatile memory 56 is loaded in the memory 52 and executed by the system control circuit 50.

In step S901, the system control circuit 50 determines whether a touched area (a "touch on" area) lies on the autobracketing close touch button 405. If the touched area lies on the autobracketing close touch button 405 (YES in step S901), the processing proceeds to step S902. Otherwise (NO in step S901), the processing proceeds to step S907. In step S902, the system control circuit 50 determines whether the present autobracketing setting value is zero, i.e., the AEB width=0 (autobracketing off). If the present autobracketing setting value is 0 (YES in step S902), the autobracketing close touch button 405 is grayed out (identification display) to indicate that the button 405 is ineffective. If the present autobracketing setting value is zero, it is ineffective to perform the touch operation on the autobracketing close touch button 405, so that the processing proceeds to step S907. If the present autobracketing setting value is not zero, the processing proceeds to step S903.

In step S903, the system control circuit 50 closes the cursor of the autobracketing value by one graduation.

In step S904, the system control circuit 50 records the width of gradations at the position where the cursor moves from the autobracketing center value in step S903 as the autobracketing setting value (AEB width) in the nonvolatile memory 56. This sets the autobracketing setting value.

In step S905, the system control circuit 50 determines whether the "touch up" operation is performed. If the "touch up" operation is performed (YES in step S905), the autobracketing open/close processing is ended. The processing proceeds to step S620 in FIG. 6. If the "touch up" operation is not performed (NO in step S905), the processing proceeds to step S906.

In step S906, the system control circuit 50 determines whether a predetermined time has elapsed since the cursor was moved in step S903. The predetermined time is used to measure a time period required until the processing corresponding to the touch position is performed again in a case where the "touch on" (kept touched) operation is continued and is 1 to 2 seconds. If the predetermined time has not elapsed (NO in step S906), the processing returns to step S905. If the predetermined time has elapsed (YES in step S906), the processing proceeds to step S907. According to such a configuration, if a touch position is not moved from the autobracketing close touch button 405 even after the predetermined time predetermined time elapses, the system control circuit 50 makes a determination of "NO" in both steps S907 and S913 described below and makes again a determination of "YES" in step S901. For this reason, the autobracketing cursor is further closed. In other words, long pressing the autobracketing close touch button 405 allows the cursor to be continuously closed. Other algorithm may be used provided that the cursor can be closed by long pressing the autobracketing close touch button 405.

Figure 5G:
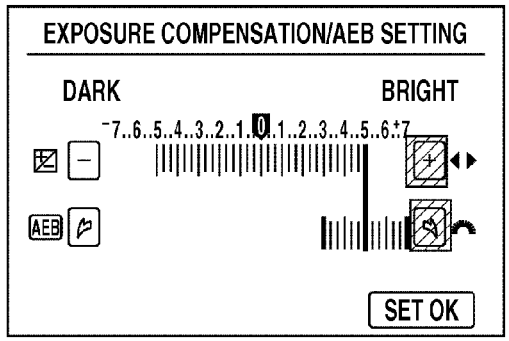

In step S907, the system control circuit 50 determines whether a touched area (a "touch on" area) lies on the autobracketing open touch button 406. If the touched area lies on the autobracketing open touch button 406 (YES in step S907), the processing proceeds to step S908. Otherwise (NO in step S907), the processing proceeds to step S913. In step S908, the system control circuit 50 determines whether the presently set autobracketing setting value is a settable maximum width. If the autobracketing setting value is the settable maximum width (YES in step S908), the autobracketing open touch button 406 is grayed out (identification display) to indicate that the button 406 is ineffective as illustrated in FIG. 5G. If the autobracketing setting value is the settable maximum width, it is ineffective to perform the touch operation on the autobracketing open touch button 406, so that the processing proceeds to step S913. If the autobracketing setting value is not the settable maximum width (NO in step S908), the processing proceeds to step S909.

In step S909, the system control circuit 50 opens the autobracketing cursor by one graduation.

In step S910, the system control circuit 50 records the width of gradations at the position where the cursor moves from the autobracketing center value in step S909 as the autobracketing setting value (AEB width) in the nonvolatile memory 56. This sets the autobracketing setting value. In step S911, the system control circuit 50 determines whether the "touch up" operation is performed. If the "touch up" operation is performed (YES in step S911), the autobracketing open/close processing is ended. The processing proceeds to step S620 in FIG. 6. If the "touch up" operation is not performed (NO in step S911), the processing proceeds to step S912.

In step S912, the system control circuit 50 determines whether a predetermined time has elapsed since the cursor was moved in step S909. If the predetermined time has not elapsed (NO in step S912), the processing returns to step S911. If the predetermined time has elapsed (YES in step S912), the processing proceeds to step S913. The processing is carried out for the reason similar to that described in step S906.

In step S913, the system control circuit 50 determines whether the "touch up" operation is performed. If the "touch up" operation is not performed (NO in step S913), the processing returns to step S901 to repeat the processing. If the "touch up" operation is performed (YES in step S913), the autobracketing open/close processing is ended. The processing proceeds to step S620 in FIG. 6.

In the above example, the system control circuit 50 changes the autobracketing setting after the predetermined time has elapsed since the "touch down" operation, irrespective of where the touch position is located (even if the touch position is changed). More specifically, the system control circuit 50 changes the value irrespective of wherever the touch position is located in any of the exposure compensation–touch button 404, the exposure compensation+touch button 403, the autobracketing open touch button 406, and the autobracketing close touch button 405. However, other configurations may be employed. For example, the system control circuit 50 stores the touch button in the position where the "touch down" operation is performed in the memory 52. The "touch down" area is compared with the touch position after that and only if the area agrees with the position, the system control circuit 50 may make the long pressing processing effective. Thus, operational error can be prevented by operating only a one touch button with a single touch.

In the above example, once the system control circuit 50 receives the touch operation in the exposure compensation touch area 401, the system control circuit 50 does not accept the touch operation in the autobracketing touch area 402 until the "touch up" operation is performed. For this reason, the setting of only any one of the exposure compensation value and the AEB width can be changed by one touch operation. Thereby, operational error can be prevented. On the other hand, the system control circuit 50 may perform the AEB setting processing instead of detecting the "touch up" operation in a case where the touch position is moved from the exposure compensation touch area 401 to the autobracketing touch area 402. Furthermore, the system control circuit 50 may perform the processing in step S604 and the subsequent steps instead of detecting the "touch up" operation in a case where the touch position is moved from the autobracketing touch area 402 to the exposure compensation touch area 401. This allows a quick setting operation because both of the exposure compensation value and the AEB width can be adjusted with a single touch operation.

Even if the exposure compensation value and the AEB width are changed at the time of the exposure compensation/AEB setting processing in FIG. 6 with the touch operation, the system control circuit 50 may be configured to store the changed value in the memory 52 instead of the nonvolatile memory 56. If the system control circuit 50 determines that the exposure compensation/AEB setting screen is instructed to end in step S612, the system control circuit 50 may store the changed value stored in the memory 52 in the nonvolatile memory 56. This reduces the number of times of access to a recording medium to enable high-speed processing.

The above exemplary embodiment has described the autobracketing of exposure compensation. The exemplary embodiment is applicable to parameters of the camera body 100 capable of autobracketing.

An indication interval between gradations and between indicators does not necessarily need to be equally spaced. The exposure compensation/autobracketing setting screen may be displayed not only on the display of the camera body 100 but on the display of a personal computer (PC), a radio equipment, and a television set which are connected to the camera body 100.

Autobracketing shooting processing is described below with reference to FIG. 10. FIG. 10 is a flow chart of the autobracketing shooting processing using the thus set exposure compensation value and the autobracketing setting value. The processing is realized such that the program stored in the nonvolatile memory 56 is loaded in the memory 52 and executed by the system control circuit 50.

The system control circuit 50 starts the processing in FIG. 10 when the shutter switch (SW1) 62 is turned on by the first stroke operation (half press) of the release button 114.

In step S1001, the system control circuit 50 acquires a value required for determining an exposure compensation value used for shooting with reference to the nonvolatile memory 56. The system control circuit 50 acquires the exposure compensation value (a reference value) set by the user with reference to the nonvolatile memory 56. If the autobracketing setting value is on (the autobracketing width is not 0), the system control circuit 50 refers to the nonvolatile memory 56 and the memory 52. The system control circuit 50 acquires an autobracketing setting value (an autobracketing width), the number of shots to be bracketed, an autobracketing order, and an autobracketing shooting number. The number of shots to be bracketed is the number of shots taken by the autobracketing shooting. The autobracketing shooting number is a number indicating what a shooting order is in the autobracketing shooting.

As an example, a case is described below where an exposure compensation value is +1, an autobracketing width is ⅓, the number of shots to be bracketed is 3, and an autobracketing order is −→0→+. In this case, if the autobracketing shooting number is one, "−" is set to a first autobracketing order, so that a compensation value used for shooting (an exposure compensation value−an autobracketing width) is 1−⅓. If the autobracketing shooting number is 2, the following order is "0," so that a compensation value used for shooting is +1 (an exposure compensation value being the autobracketing center value). If the autobracketing shooting number is 3, the following order is "+," so that a compensation value used for shooting is 1+⅓.

In step S1002, the system control circuit 50 performs a light metering calculation (AE processing) for determining a shutter speed (CCD storage time) and an aperture value based on the compensation value determined in step S1001.

In step S1003, the system control circuit 50 performs a distance measurement operation using a known phase difference detection method to focus on an object.

In step S1004, the system control circuit 50 drives a focus lens based on the data acquired by the distance measurement operation (AF processing).

In step S1005, the system control circuit 50 determines whether the start of shooting is instructed such that the second stroke operation (full press) of the release button 114 turns on the shutter switch (SW2) 64. If the start of shooting is instructed (YES in step S1005), the processing proceeds to step S1006. If the start of shooting is not instructed (NO in step S1005) and the shutter switch (SW1) 62 is turned off, the system control circuit 50 ends shooting processing. If the start of shooting is not instructed and the shutter switch (SW1) 62 is kept turning on, the system control circuit 50 waits for instructions for the start of shooting.

If the start of shooting is instructed, in step S1006, the system control circuit 50, the shutter control unit 40, and the diaphragm control unit 340 perform a shooting operation (exposure) and, in step S1007, perform post-processing for shooting (development processing and record processing). The shooting operation includes a CCD gain setting, a CCD storage operation, and a CCD reading.

In step S1008, the system control circuit 50 adds "1" to the autobracketing number stored in the memory 52.

In step S1009, the system control circuit 50 determines whether the autobracketing number stored in the memory 52 is smaller than the number of shots to be bracketed. If the autobracketing number is not smaller than the number of shots to be bracketed (i.e., the autobracketing number reaches the number of shots to be bracketed) (NO in step S1009), the processing proceeds to step S1010. If the autobracketing number is smaller than the number of shots to be bracketed (YES in step S1009), the processing returns to step S1001 and the system control circuit 50 performs shooting preparation processing for the following autobracketing shooting. Thereafter, the system control circuit 50 performs the following autobracketing shooting if the system control circuit 50 is instructed to start shooting. If the system control circuit 50 is not instructed to start shooting, the system control circuit 50 ends the shooting processing with the autobracketing number kept stored, and starts the autobracketing shooting at the following autobracketing number at the next shooting processing.

In step S1010, the system control circuit 50 resets the autobracketing number to "0".

The control processing of the system control circuit 50 may be performed by one piece of hardware. Alternatively, a plurality of pieces of hardware may share the processing to control the entire apparatus.

The above example describes that one image is captured by issuing instructions for starting shooting (SW2) once. One set of shooting (a plurality of number of times) may be continuously performed according to the instructions for starting shooting (SW2) issued once.

Furthermore, the above example describes an exposure autobracketing-shooting. The present invention is not limited to the exposure autobracketing-shooting, but applicable to an autobracketing shooting under other shooting conditions. For example, the present invention is applicable to a method for setting a compensation value with reference to a reference value of the autobracketing shooting related to flash shooting, shutter speed, aperture value, white balance, ISO sensitivity, and focus.

The present invention is also applicable to a method for setting a compensation value with reference to the reference value in conducting a high dynamic-range (HDR) shooting or a multiple-exposure shooting a plurality of number of times under different shooting conditions such as exposure and ISO sensitivity. In other words, one item or a combination of a plurality of items described above can be applied as shooting setting items to be changed in the autobracketing shooting.

In the above exemplary embodiment, a case where the present invention is applied to a digital single-lens reflex camera is described as an example. However, the present invention is not limited to the digital single-lens reflex camera. The present invention is applicable to an apparatus equipped with a shooting unit and a touch panel whereby the user can operate or set the shooting unit irrespective of types. The present invention is applicable to a personal computer, a personal digital assistant (PDA), a cellular phone terminal, a portable image viewer, a printer with a display, a digital photo frame, a music player, a game machine, and an electronic book reader, for example.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-002404 filed Jan. 10, 2012, which is hereby incorporated by reference herein in its entirety.

What is claimed is:

1. An imaging apparatus comprising:
a touch detection unit configured to detect a touch operation on a display unit;
a display control unit configured to control display in a same screen of the display unit:
(a) a scale;
(b) first indicators indicating a range of values settable as an exposure compensation setting, wherein the first indicators are arranged in association with the scale; and
(c) second indicators indicating a range of values settable as a bracketing value in an autobracketing shooting, an indicator indicating a reference value in the autobracketing shooting, and an indicator indicating the bracketing value, wherein the second indicators are arranged in association with the scale and the first indicators; and
a setting unit configured to
set an exposure compensation value corresponding to an indicator of a touched position in a case where the touch detection unit detects a touch corresponding to a first touch area including the first indicators in the display unit, and
in a case where the touch detection unit detects a touch to a second area which is wider than an area in which the second indicators are displayed and which includes the area in which the second indicators are displayed, set the bracketing value so as to widen a width between the indicator indicating the reference value and the indicator indicating the bracketing value according to the touch operation which moves to a first direction while continuing to touch irrespective of where the touch started in the second area, and set the bracketing value so as to narrow the width between the indicator indicating the reference value and the indicator indicating the bracketing value according to the touch operation which moves to a second direction which is opposite to the first direction while continuing to touch irrespective of where the touch started in the second area.

2. The imaging apparatus according to claim 1, wherein the touch operation is an operation for touching one point on the display unit.

3. The imaging apparatus according to claim 1, wherein, when the width is "0" and the touch detection unit does not detect the touch operation, the display control unit does not display the indicator indicating the reference value and the indicator indicating the bracketing value, and when the width is "0" and the touch detection unit detects the touch operation, the display control unit performs control to display the indicator indicating the reference value.

4. The imaging apparatus according to claim 1, wherein the display control unit performs control to move the indicator indicating the bracketing value according to the touch operation detected by the touch detection unit and which moves while continuing to touch the setting area.

5. The imaging apparatus according to claim 1, wherein the display control unit moves the indicator indicating the bracketing value at a distance smaller than an amount of movement of the touch operation according to the touch operation detected by the touch detection unit and which moves while continuing to touch the setting area.

6. The imaging apparatus according to claim 1, wherein the display control unit performs control to display a first touch button for receiving an instruction for increasing the width and a second touch button for receiving an instruction for decreasing the width in a position different from the setting area of the screen in which the setting area is displayed, and
wherein the control unit performs control to increase the width based on a number of times of the touch operation and/or a touch continuation time of the touch operation in response to the touch detection unit detecting the touch operation on the first touch button, and to decrease the width based on the number of times of the touch operation and/or the touch continuation time of the touch operation in response to the touch detection unit detecting the touch operation on the second touch button.

7. The imaging apparatus according to claim 1, further comprising a shooting control unit configured to perform control to perform an autobracketing shooting for acquiring an image in which a specific shooting setting is acquired as a setting based on the reference value and an image in which the specific shooting setting is acquired as a setting based on the bracketing value set by the bracketing value setting unit.

8. The imaging apparatus according to claim 1, wherein the autobracketing shooting relates to at least one of exposure, flash, shutter speed, aperture value, white balance, ISO sensitivity, and focus.

9. A method for controlling an imaging apparatus, the method comprising:
detecting a touch operation on a display unit;
controlling display, in a same screen of the display unit, of
(a) a scale,
(b) first indicators indicating a range of values settable as an exposure compensation setting, wherein the first indicators are arranged in association with the scale, and
(c) second indicators indicating a range of values settable as a bracketing value in an autobracketing shooting, an indicator indicating a reference value in the autobracketing shooting, and an indicator indicating the bracketing value, wherein the second indicators are arranged in association with the scale and the first indicators;
setting an exposure compensation value corresponding to an indicator of a touched position in a case where a touch corresponding to a first touch area including the first indicators in the display unit is detected; and
in a case where a touch to a second area which is wider than an area in which the second indicators are displayed and which includes the area in which the second indicators are displayed is detected, setting the bracketing value so as to widen a width between the indicator indicating the reference value and the indicator indicating the bracketing value according to a touch operation which moves to a first direction while continuing to touch irrespective of where the touch started in the second area, and setting the bracketing value so as to narrow the width between the indicator indicating the reference value and the indicator indicating the bracketing value according to a touch operation which moves to a second direction which is opposite to the first direction while continuing to touch irrespective of where the touch started in the second area.

10. A non-transitory computer-readable storage medium storing a program that causes a computer to function as each unit of the imaging apparatus according to claim 1.

11. The imaging apparatus according to claim 1, wherein, in a case where the width is zero as a result of detecting the touch operation which moves to the second direction while continuing to touch the second area and narrowing the width, the setting unit is configured to perform control so that the width is not changed even if the touch operation to move farther to the second direction is detected.

12. An imaging apparatus comprising:
   a touch detection unit configured to detect a touch operation on a display unit;
   a display control unit configured to control display in a same screen of the display unit:
      (a) a scale;
      (b) first indicators indicating a range of values settable as an exposure compensation setting, wherein the first indicators are arranged in association with the scale; and
      (c) second indicators indicating a range of values settable as a bracketing value in an autobracketing shooting, an indicator indicating a reference value in the autobracketing shooting, and an indicator indicating the bracketing value, wherein the second indicators are arranged in association with the scale and the first indicators; and
   a setting unit configured to
      set an exposure compensation value corresponding to an indicator of a touched position in a case where the touch detection unit detects a touch corresponding to a first touch area including the first indicators in the display unit, and
      in a case where the touch detection unit detects a touch to a second area which includes the area in which the second indicators are displayed, set the bracketing value so as to widen a width between the indicator indicating the reference value and the indicator indicating the bracketing value according to the touch operation which moves to a first direction while continuing to touch irrespective of where the touch started in the second area, and set the bracketing value so as to narrow the width between the indicator indicating the reference value and the indicator indicating the bracketing value according to the touch operation which moves to a second direction which is opposite to the first direction while continuing to touch irrespective of where the touch started in the second area.

13. A method for controlling an imaging apparatus, the method comprising:
   detecting a touch operation on a display unit;
   controlling display, in a same screen of the display unit, of
      (a) a scale,
      (b) first indicators indicating a range of values settable as an exposure compensation setting, wherein the first indicators are arranged in association with the scale, and
      (c) second indicators indicating a range of values settable as a bracketing value in an autobracketing shooting, an indicator indicating a reference value in the autobracketing shooting, and an indicator indicating the bracketing value, wherein the second indicators are arranged in association with the scale and the first indicators;
   setting an exposure compensation value corresponding to an indicator of a touched position in a case where a touch corresponding to a first touch area including the first indicators in the display unit is detected; and
   in a case where a touch to a second area which includes the area in which the second indicators are displayed is detected, setting the bracketing value so as to widen a width between the indicator indicating the reference value and the indicator indicating the bracketing value according to a touch operation which moves to a first direction while continuing to touch irrespective of where the touch started in the second area, and setting the bracketing value so as to narrow the width between the indicator indicating the reference value and the indicator indicating the bracketing value according to a touch operation which moves to a second direction which is opposite to the first direction while continuing to touch irrespective of where the touch started in the second area.

* * * * *